US011209071B2

(12) United States Patent
Gettler et al.

(10) Patent No.: US 11,209,071 B2
(45) Date of Patent: Dec. 28, 2021

(54) PLANETARY TRANSMISSION

(71) Applicants: Ralf Gettler, Borken (DE); Dirk Holweger, Nuremberg (DE)

(72) Inventors: Ralf Gettler, Borken (DE); Dirk Holweger, Nuremberg (DE)

(73) Assignee: FLENDER GMBH, Bocholt (DE)

( * ) Notice: Subject to any disclaimer, the term of this patent is extended or adjusted under 35 U.S.C. 154(b) by 0 days.

(21) Appl. No.: 16/863,407

(22) Filed: Apr. 30, 2020

(65) Prior Publication Data

US 2020/0347914 A1 Nov. 5, 2020

(30) Foreign Application Priority Data

Apr. 30, 2019 (EP) ..................... 19171876

(51) Int. Cl.
*F16H 1/46* (2006.01)
*F03D 15/00* (2016.01)
*F16D 1/06* (2006.01)

(52) U.S. Cl.
CPC ............... *F16H 1/46* (2013.01); *F03D 15/00* (2016.05); *F16D 1/06* (2013.01)

(58) Field of Classification Search
None
See application file for complete search history.

(56) References Cited

U.S. PATENT DOCUMENTS

| 8,974,140 | B2* | 3/2015 | Durling | ................... | F16D 1/033 |
| | | | | | 403/359.6 |
| 9,790,997 | B2* | 10/2017 | Bell | ........................ | F16H 35/10 |
| 10,125,858 | B2 | 11/2018 | Mccune et al. | | |
| 10,495,435 | B2* | 12/2019 | Matsunaga | ............... | G01B 5/24 |
| 10,513,148 | B2* | 12/2019 | Fuchs | ..................... | F16D 1/108 |
| 2017/0082150 | A1* | 3/2017 | Uhrick | ..................... | F16D 1/076 |
| 2019/0264745 | A1* | 8/2019 | Hiramatsu | ............... | B21K 1/05 |
| 2020/0149592 | A1* | 5/2020 | Rejman | .................... | F16D 1/108 |

FOREIGN PATENT DOCUMENTS

| DE | 9202238 | U1 | 4/1992 | | |
| DE | 102016202533 | A1 | 8/2017 | | |
| FR | 2941754 | B1 * | 1/2011 | ............. | F16D 1/076 |

OTHER PUBLICATIONS

European Search Report for European Application No. 19171876. 6-1012 dated Oct. 11, 2019.
Indian Office Action for Indian Patent Application No. 202034017744 dated Mar. 12, 2021.

* cited by examiner

*Primary Examiner* — Dirk Wright
(74) *Attorney, Agent, or Firm* — Lempia Summerfield Katz LLC

(57) ABSTRACT

A planetary transmission includes at least two planetary stages. A sun shaft of a planetary stage of the at least two planetary stages is connected for transmission of torque via a coupling toothing system to a planetary carrier of a second transmission stage of the at least two planetary stages that follows the first transmission stage. The coupling toothing system is a flat notch toothing system. A drive train of a wind power plant, in which a corresponding planetary transmission is used as transmission, is also provided. A wind power plant that is equipped with a corresponding drive train is provided. An industrial application that has a corresponding planetary transmission as transmission is also provided.

12 Claims, 5 Drawing Sheets

PLANETARY TRANSMISSION

This application claims the benefit of European Patent Application No. EP 19171876.6, filed on Apr. 30, 2019, which is hereby incorporated by reference in its entirety.

BACKGROUND

The present embodiments relate to a planetary transmission with at least two transmission stages.

DE 10 2016 202 533 A1 discloses a planetary transmission. German utility model DE 92 02 238 discloses a shaft that is split by a Hirth toothing system and is connected to a planetary transmission.

SUMMARY AND DESCRIPTION

The scope of the present invention is defined solely by the appended claims and is not affected to any degree by the statements within this summary.

The present embodiments may obviate one or more of the drawbacks or limitations in the related art. For example, improved designs of a planetary transmission, a drive train, a wind power plant, and an industrial application are provided.

A planetary transmission is characterized in that a coupling toothing system is a flat notch toothing system. Thanks to the use of a flat notch toothing system, which is frequently also referred to as a spur toothing system, it is possible to save axial and/or radial installation space in relation to a main rotational axis, which considerably facilitates the design of the planetary transmission based on overall dimensions specified by the customer.

In accordance with one variant of the planetary transmission, the spur toothing systems that form the flat notch toothing system are provided firstly on an end side of the sun shaft and secondly on an end side of the planetary carrier. The end side of the planetary carrier bears against the end side of the sun shaft axially in relation to the main rotational axis. In the case of the variant, the sun shaft and the planetary carrier are therefore connected to one another on the end side directly via the flat notch toothing system, which makes the provision of a hub at this location superfluous. This makes it possible to save installation space in the axial and radial direction in relation to the main rotational axis. The production of the planetary carrier is very inexpensive, since a small amount of material is required for the planetary carrier. The planetary carrier is very readily accessible for machining.

The sun shaft and the planetary carrier may be fastened to one another with the use of fastening elements that extend axially in relation to the main rotational axis and may be positioned at regular spacings from one another. The fastening elements may be fastening screws that are positioned on a common hole circle. Particularly simple and inexpensive axial securing of the connection of the sun shaft and the planetary carrier is realized by fastening screws of this type.

The fastening elements extend through the flat notch toothing system. In this way, for example, radial installation space in relation to the main rotational axis may then be saved if the sun shaft is configured as a hollow shaft.

In accordance with a further variant of the planetary transmission, the spur toothing systems that form the flat notch toothing system are provided on an end side of a hub that is fastened fixedly on the outer circumference of the sun shaft so as to rotate with the sun shaft, and provided on an end side of the planetary carrier. The end side of the planetary carrier bears against the end side of the sun shaft axially. In the case of the variant, the sun shaft and the planetary carrier are therefore connected to one another indirectly via a hub that is arranged on the outer circumference of the sun shaft. The flat notch toothing system is provided on the hub and on the planetary carrier. On account of the separation of the hub and the planetary carrier, the design makes simpler and less expensive production and machining of the individual components possible, thanks to the improved accessibility of the individual components, possibly even with the use of other machines. In addition, the machining of the hub and that of the planetary carrier may be commissioned separately, and machine tools that are set up in an optimum manner for the respective machining operation may thus be selected. Logistics costs may also be saved, since the entire planetary carrier is currently frequently to be transported over great distances in order to machine the hub section.

In the case of the second variant, the hub and the planetary carrier may also be fastened to one another with the use of the fastening elements that extend axially in relation to the main rotational axis and are, for example, positioned at regular spacings from one another. The fastening elements may be fastening screws that are positioned on a common hole circle.

The fastening elements also extend through the flat notch toothing system.

The hub may be connected to the sun shaft via a coupling toothing system, and, for example, is secured against an axial displacement in relation to the main rotational axis, which results in a simpler and more stable construction.

DETAILED DESCRIPTION

In the following text, same designations denote same or identically configured components or component regions.

Figure 1:
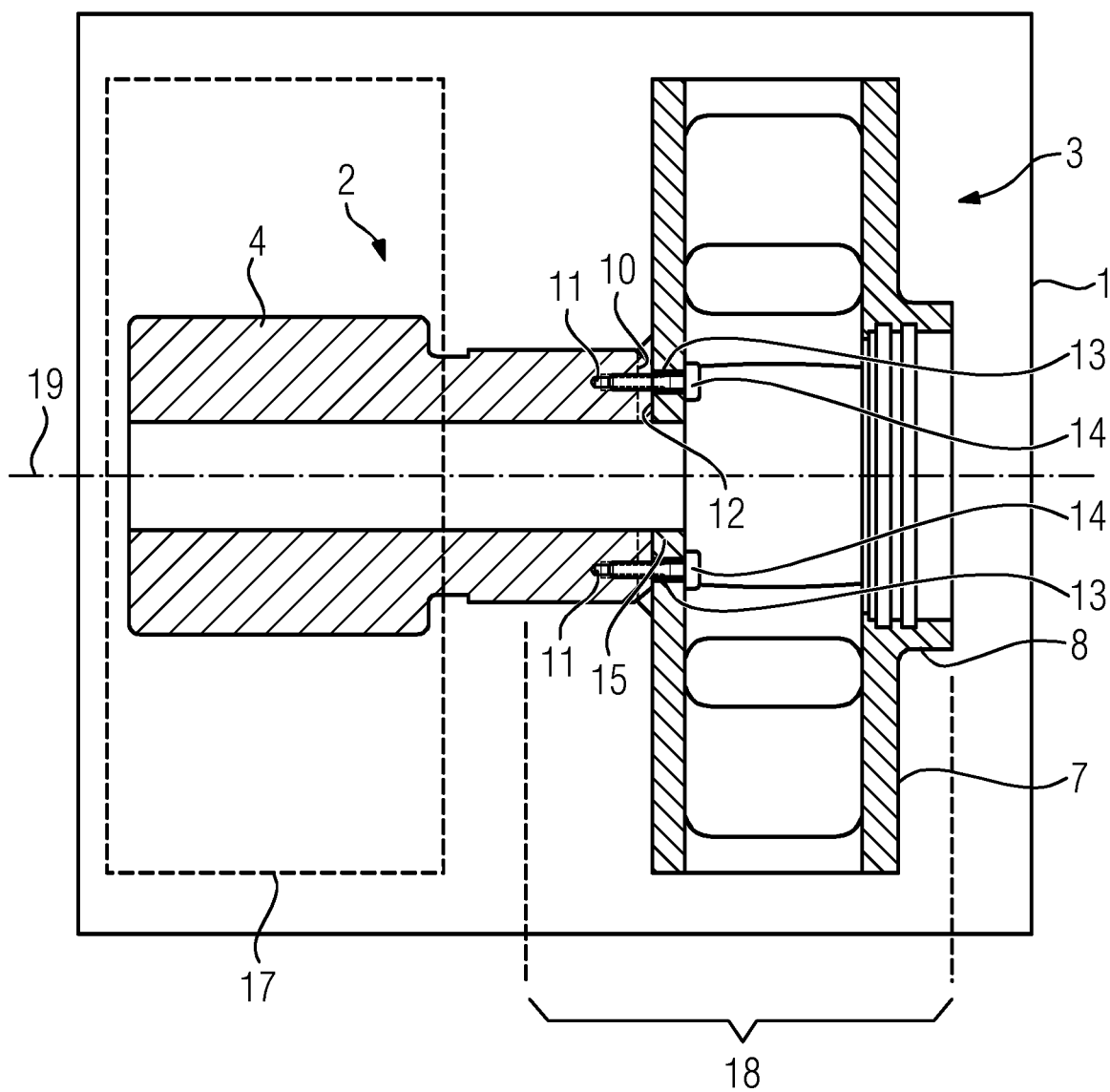
FIG. 1 shows a diagrammatic sectional view of a region of a planetary transmission in accordance with a first embodiment.

FIG. 1 shows components of a planetary transmission 1 in accordance with one embodiment. The planetary transmission 1 includes a sun shaft 2 of a planetary stage 17 (e.g., a first planetary stage). The sun shaft 2 is configured in one piece as a hollow shaft. The planetary transmission 1 also includes a planetary carrier 3 of a further planetary stage 18 (e.g., a second planetary stage) that follows the planetary stage 17. The planetary carrier 3 is connected to the sun shaft 2 and, in the present case, is likewise configured in one piece. At a first free end, the sun shaft 2 is provided with a sun toothing system 4. At a second free end of the sun shaft 2, a spur toothing system 10 with teeth that extend at least substantially radially in relation to a main rotational axis 19 of the planetary transmission 1 is formed on a corresponding end side. The spur toothing system 10 defines a first part of a flat notch toothing system. A number of threaded bores 11 are arranged on the end side at the second free end of the sun shaft 2. The threaded bores 11 extend through the spur toothing system 10 in the axial direction in relation to the main rotational axis 19 and are positioned at uniform spacings along a hole circle in the present case. At a first free end that faces the sun shaft 2, the planetary carrier 3 defines a spur toothing system 12 with teeth that extend at least substantially radially in relation to the main rotational axis 19. The spur toothing system 12 is configured in accordance with the spur toothing system 10 of the sun shaft 2 and defines the second part of the flat notch toothing system. Accordingly, the spur toothing system 12 of the planetary carrier 3 may be placed onto the spur toothing system 10 of the sun shaft 2 axially in relation to the main rotational axis 19 such that the sun shaft 2 and the planetary carrier 3 are connected fixedly to one another so as to rotate together, in a manner that is centered relative to one another, and are secured in the circumferential direction and in the radial direction in relation to the main rotational axis 19. In the region of the spur toothing system 12, through bores 13 that correspond to the threaded bores 11 of the sun shaft 2 and through which fastening elements 14 (e.g., in the form of fastening screws in the present case) are inserted from the outside and are screwed into the threaded bores 11 are provided. In order that the through bores 13 of the planetary carrier 3 are accessible from the outside, the spur toothing system 12 and the through bores 13 are provided on an annular flange 15 that projects radially inward in relation to the main rotational axis 19 and is dimensioned such that the fastening elements 14 may be inserted into the through bores 13 starting from that free end of the planetary carrier 3 that faces away from the sun shaft 2. Otherwise, the planetary carrier 3 has a planetary gear receiving section 7 and an end section 8.

The construction that is shown in FIG. 1 is distinguished, for example, by the fact that, thanks to the fact that the torque transmission takes place via a flat notch toothing system that connects the sun shaft 2 and the planetary carrier 3 to one another, less radial installation space in relation to the main rotational axis 19 is required. Moreover, the sun shaft 2 may also be of very short configuration in order to additionally gain axial installation space. A further advantage that accompanies the construction shown in FIG. 1 includes that the planetary carrier 3 may be produced and machined simply and inexpensively. This is due to the fact that a small amount of material is required thanks to the spur toothing system 10, 12. The planetary carrier 3 is also very readily accessible for machining. Oil ducts or the like may thus be made very simply in the planetary carrier 3.

Figure 2:
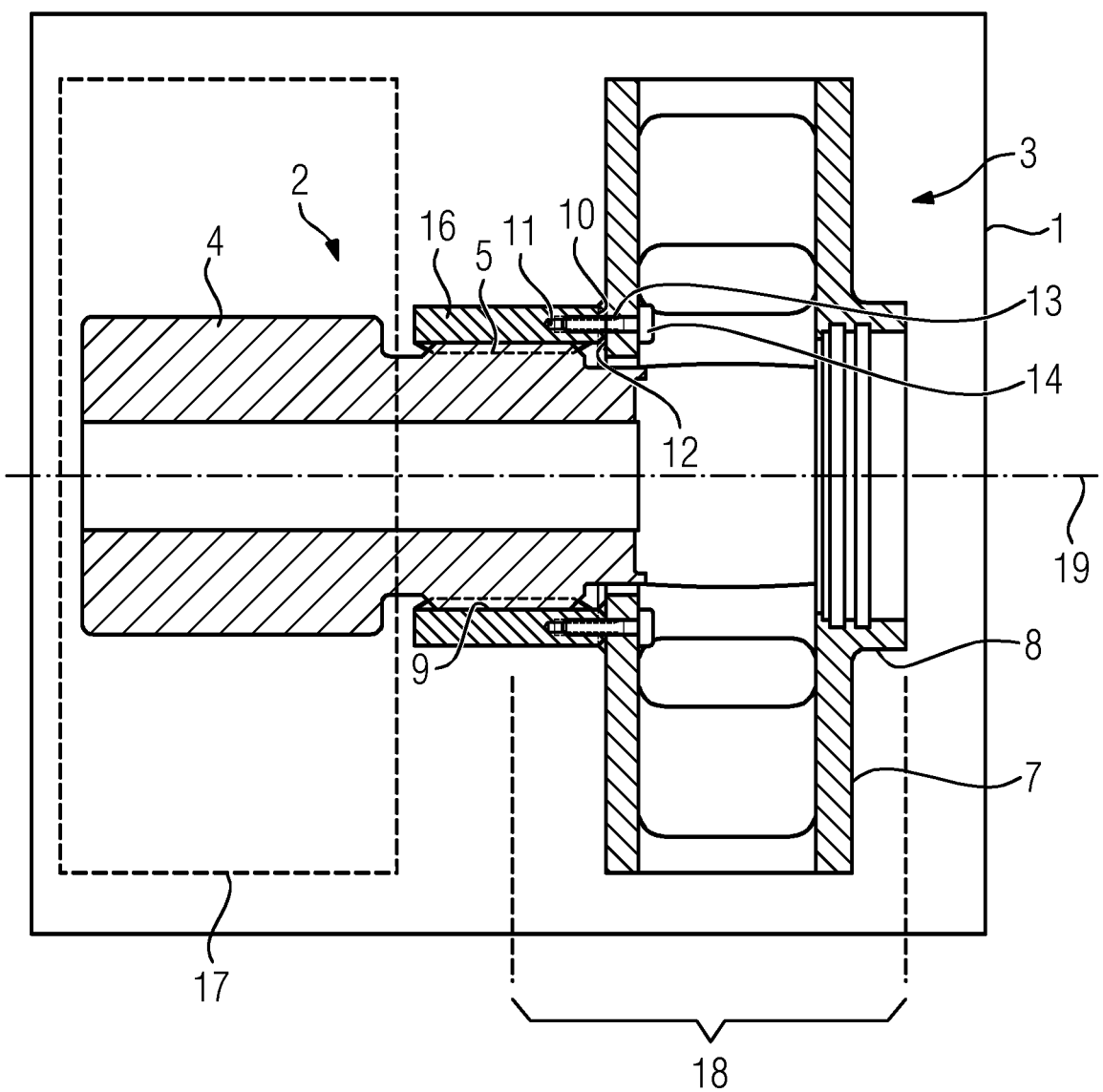
FIG. 2 shows a diagrammatic sectional view of a region of a planetary transmission in accordance with a second embodiment.

FIG. 2 shows components of a planetary transmission 1 in accordance with a further embodiment. The planetary transmission 1 includes a sun shaft 2 of a planetary stage 17. The sun shaft 2 is configured in one piece as a hollow shaft. The planetary transmission 1 also includes a planetary carrier 3 of an adjoining further planetary stage 18. The planetary carrier 3 is connected to the sun shaft 2 indirectly via a hub 16 and in the present case is likewise configured in one piece. The sun shaft 2 includes a sun toothing system 4 that is arranged at the first free end, and an outer circumferential toothing system 5 that is provided at the second free end. Teeth of the outer circumferential toothing system 5 extend in the axial direction in relation to the main rotational axis 19. The hub 16 is of annular configuration and is provided along an inner circumference with an inner circumferential toothing system 9 that corresponds to the outer circumferential toothing system 5 of the sun shaft 2. Accordingly, the hub 16 may be pushed onto the sun shaft 2 axially in relation to the main rotational axis 19. The inner circumferential toothing system 9 of the hub 16 is brought into engagement with the outer circumferential toothing system 5 of the sun shaft 2 such that the hub 16 is secured on the sun shaft 2 in the circumferential direction and in the radial direction in relation to the main rotational axis 19. Axial securing may take place, for example, via a securing ring, via fastening screws, or the like. On an end side that points toward the planetary carrier 3, the hub 16 is provided with a spur toothing system 10 that defines a first part of a flat notch toothing system. The second part of the flat notch toothing system is configured on the planetary carrier 3 on the end side in the form of a spur toothing system 12. In a similar manner to that in the case of the first embodiment, which is shown in FIG. 1, the fastening of the planetary carrier 3 to the hub 16 takes place via fastening elements 13 that extend axially in relation to the main rotational axis 19 (e.g., in the form of fastening screws that are guided through through bores 13 that are provided on the planetary carrier 3, and are screwed into threaded bores 11 that are configured on the hub 16 on the end side in the region of the spur toothing system 10). Accordingly, the planetary carrier 3 may be pushed onto the sun shaft 2 axially in relation to the main rotational axis 19 until the spur toothing systems 12 of the planetary carrier and the spur toothing system 10 of the hub 16 are brought into engagement with one another. As a result of this, securing in the circumferential direction and in the radial direction in relation to the main rotational axis 19 is also achieved.

On account of the separation of the hub 16 and the planetary carrier 3, the configuration that is shown in FIG. 2 makes simple and inexpensive production and machining of the individual components possible thanks to the improved accessibility thereof. In addition, the machining of the hub 16 and that of the planetary carrier 3 may be commissioned separately, and machine tools that are set up in an optimum manner for the respective machining operation may thus be selected. Logistics costs may also be saved, since the entire planetary carrier 3 does not have to be transported over great distances.

Figure 3:
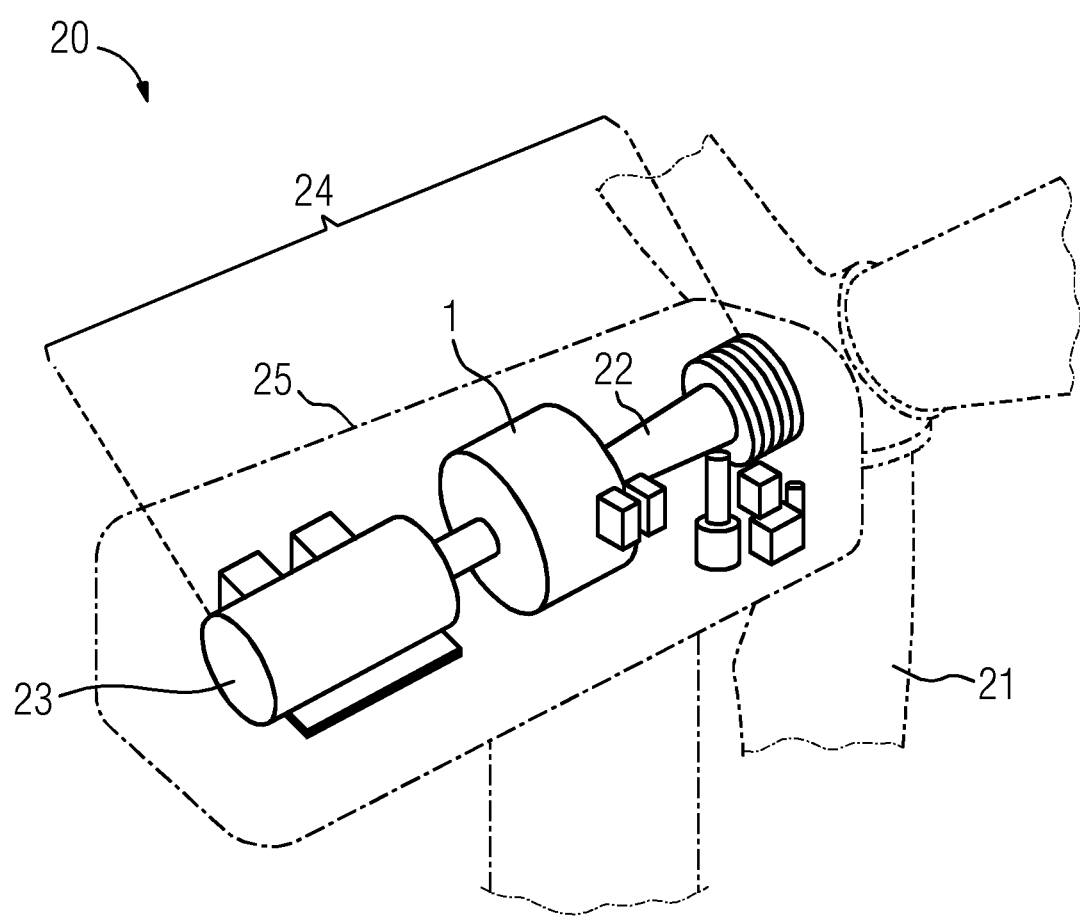
FIG. 3 shows a sectioned side view of one embodiment of a wind power plant with a planetary transmission.

FIG. 3 shows a sectioned oblique view of one embodiment of a wind power plant 20. The wind power plant 20 includes a rotor 21 that may be set in rotation by way of wind. The rotor 21 is connected in a torque-transmitting manner via a rotor shaft 22 to a planetary transmission 1 according to the present embodiments. The planetary transmission 1 is connected in a torque-transmitting manner to a generator 23. The rotor shaft 22, the planetary transmission 1, and the generator 23 belong to a drive train 24 that is received in a nacelle 25 of the wind power plant 20. The generator 23 has two, three, or four pole pairs. Thanks to the planetary transmission 1, the drive train 24 has small dimensions, which facilitates, for example, the assembly of the wind power plant 20. The drive train 24 may also be produced inexpensively.

Figure 4:
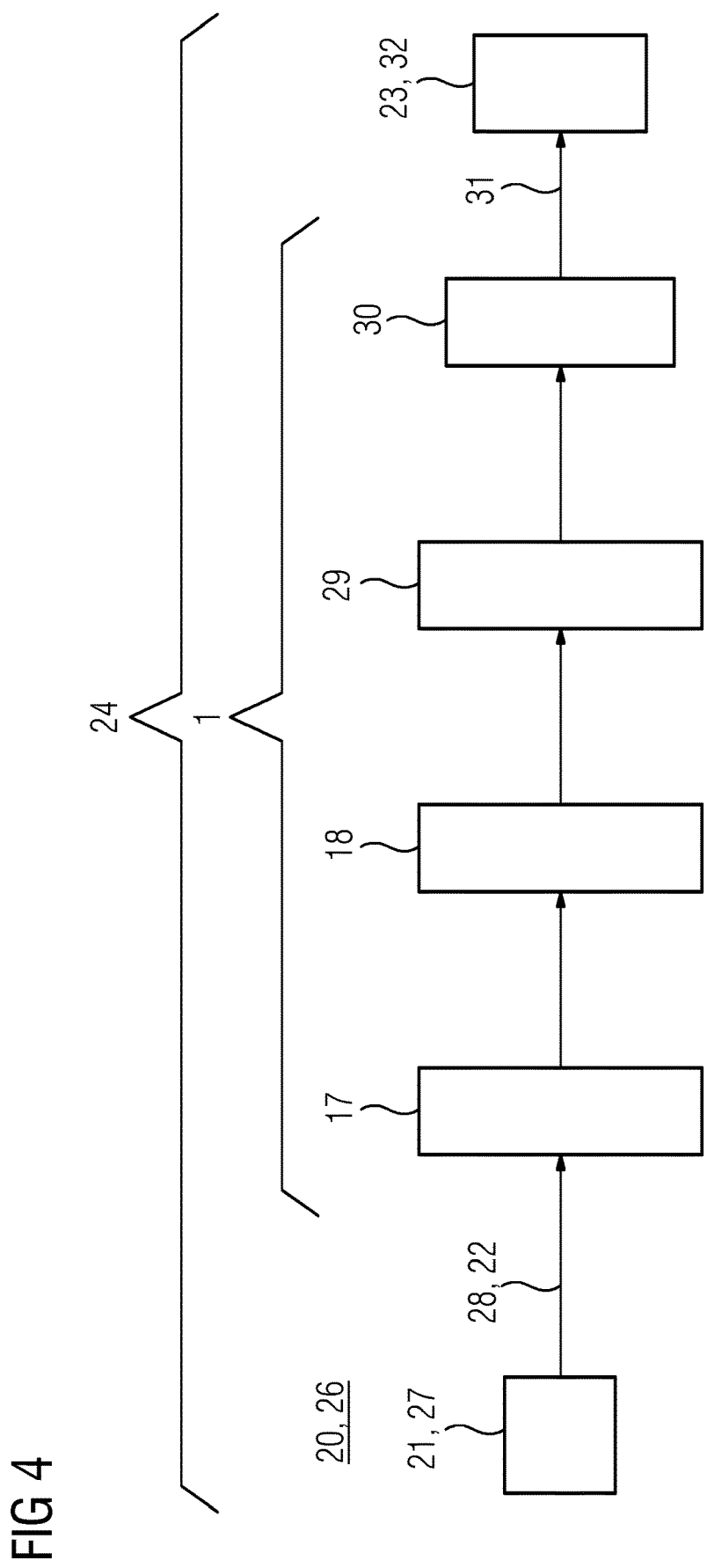
FIG. 4 shows a diagrammatic illustration of one embodiment of a drive train.

FIG. 4 shows a diagrammatic construction of a further embodiment of the drive train 24 that may be used in a wind power plant 20 (not shown in greater detail) or an industrial application 26 (not shown in greater detail). The drive train 24 includes a planetary transmission 1 according to the present embodiments that is connected on the input side to a drive 27 or a rotor 21 of the wind power plant 20, and to which drive power 28 is thus fed. In a wind power plant 20, this takes place using a rotor shaft 22. In the present case, the planetary transmission 1 includes three planetary stages 17, 18, and 29 that are arranged behind one another, and a last transmission stage 30 that is configured as a spur gear stage.

The three planetary stages 17, 18, and 29 and the last transmission stage 30 are connected to one another according to the present embodiments. The transmission stages 17, 18, 29, and 30 output output power 31 to a generator 23 or a mechanical application 32.

Figure 5:
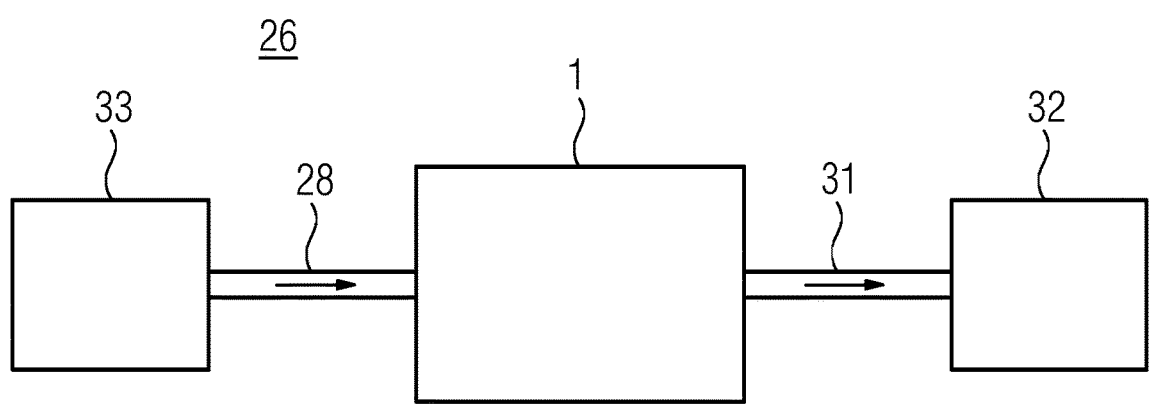
FIG. 5 shows a diagrammatic illustration of one embodiment of an industrial application.

FIG. 5 diagrammatically shows the construction of one embodiment of an industrial application 26 that has a drive 33. The drive 33 is configured to provide drive power 28 that is transported via a torque-transmitting connection to a transmission 1 according to the present embodiments. The transmission 1 is connected in a torque-transmitting manner to a mechanical application 32 in order to transmit output power 31 to the mechanical application 32. To this end, the transmission 1 is configured as a planetary transmission, according to one of the embodiments outlined above.

Although the invention has been described and illustrated in greater detail via the exemplary embodiments, the invention is not restricted to the examples that are disclosed, and other variations may be derived therefrom by a person skilled in the art without departing from the scope of protection of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description

The invention claimed is:

1. A planetary transmission comprises:
at least two planetary stages, a first planetary stage of the at least two planetary stages including a sun shaft, the sun shaft being rotatable about a main rotational axis and being connected for transmission of torque via a coupling toothing system to a planetary carrier of a second planetary stage of the at least two planetary stages, the second planetary stage following the first planetary stage,
wherein the coupling toothing system is a flat notch toothing system, and
wherein spur toothing systems form the flat notch toothing system, the spur toothing systems being provided on an end side of a hub that is fastened fixedly on an outer circumference of the sun shaft so as to rotate with the sun shaft and on an end side of the planetary carrier, the end side of the planetary carrier bearing against the end side of the hub axially in relation to the main rotational axis.

2. The planetary transmission of claim 1, wherein spur toothing systems form the flat notch toothing system, the spur toothing systems being provided on an end side of the sun shaft and on an end side of the planetary carrier, the end side bearing against the end side of the sun shaft axially in relation to the main rotational axis.

3. The planetary transmission of claim 2, wherein the sun shaft and the planetary carrier are fastened to one another with fastening elements that extend axially in relation to the main rotational axis.

4. The planetary transmission of claim 3, wherein the fastening elements are positioned at regular spacings from one another.

5. The planetary transmission of claim 3, wherein the fastening elements extend through the flat notch toothing system.

6. The planetary transmission of claim 1, wherein the hub and the planetary carrier are fastened to one another with fastening elements that extend axially in relation to the main rotational axis.

7. The planetary transmission of claim 6, wherein the fastening elements are positioned at regular spacings from one another.

8. The planetary transmission of claim 6, wherein the fastening elements extend through the flat notch toothing system.

9. The planetary transmission of claim 1, wherein the hub is connected to the sun shaft via a coupling toothing system.

10. A drive train comprising:
a rotor shaft that is connected in a torque-transmitting manner to a transmission, the transmission being connected in a torque-transmitting manner to a generator,
wherein the transmission is configured as a planetary transmission, the planetary transmission comprising at least two planetary stages, a first planetary stage of the at least two planetary stages including a sun shaft, the sun shaft being rotatable about a main rotational axis and being connected for transmission of torque via a coupling toothing system to a planetary carrier of a second planetary stage of the at least two planetary stages, the second planetary stage following the first planetary stage,
wherein the coupling toothing system is a flat notch toothing system, and
wherein spur toothing systems form the flat notch toothing system, the spur toothing systems being provided on an end side of a hub that is fastened fixedly on an outer circumference of the sun shaft so as to rotate with the sun shaft and on an end side of the planetary carrier, the end side of the planetary carrier bearing against the end side of the hub axially in relation to the main rotational axis.

11. A wind power plant comprising:
a rotor that is attached to a nacelle;
a drive train that is connected in a torque-transmitting manner to the rotor, the drive train being arranged in the nacelle, the drive train comprising a rotor shaft that is connected in a torque-transmitting manner to a transmission, the transmission being connected in a torque-transmitting manner to a generator,
wherein the transmission is configured as a planetary transmission, the planetary transmission comprising at least two planetary stages, a first planetary stage of the at least two planetary stages including a sun shaft, the sun shaft being rotatable about a main rotational axis and being connected for transmission of torque via a coupling toothing system to a planetary carrier of a second planetary stage of the at least two planetary stages, the second planetary stage following the first planetary stage,
wherein the coupling toothing system is a flat notch toothing system, and wherein spur toothing systems form the flat notch toothing system, the spur toothing systems being provided on an end side of a hub that is fastened fixedly on an outer circumference of the sun shaft so as to rotate with the sun shaft and on an end side of the planetary carrier, the end side of the planetary carrier bearing against the end side of the hub axially in relation to the main rotational axis.

12. An industrial application comprising:
a drive that is connected in a torque-transmitting manner to a transmission, the transmission being coupled in a torque-transmitting manner to a mechanical application,
wherein the transmission is configured as a planetary transmission, the planetary transmission comprising at least two planetary stages, a first planetary stage of the at least two planetary stages including a sun shaft, the sun shaft being rotatable about a main rotational axis and being connected for transmission of torque via a coupling toothing system to a planetary carrier of a second planetary stage of the at least two planetary stages, the second planetary stage following the first planetary stage,
wherein the coupling toothing system is a flat notch toothing system, and
wherein spur toothing systems form the flat notch toothing system, the spur toothing systems being provided on an end side of a hub that is fastened fixedly on an outer circumference of the sun shaft so as to rotate with the sun shaft and on an end side of the planetary carrier, the end side of the planetary carrier bearing against the end side of the hub axially in relation to the main rotational axis.

* * * * *